United States Patent
Kool

(10) Patent No.: US 10,501,839 B2
(45) Date of Patent: Dec. 10, 2019

(54) METHODS OF REMOVING A CERAMIC COATING FROM A SUBSTRATE

(71) Applicant: GENERAL ELECTRIC COMPANY, Schenectady, NY (US)

(72) Inventor: Lawrence Bernard Kool, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/950,510

(22) Filed: Apr. 11, 2018

(65) Prior Publication Data

US 2019/0316244 A1     Oct. 17, 2019

(51) Int. Cl.
| | |
|---|---|
| *C23C 8/80* | (2006.01) |
| *C23C 8/04* | (2006.01) |
| *C23C 8/26* | (2006.01) |
| *B05D 7/14* | (2006.01) |
| *B05D 3/02* | (2006.01) |
| *C09K 13/08* | (2006.01) |

(52) U.S. Cl.
CPC .......... *C23C 8/80* (2013.01); *B05D 3/0254* (2013.01); *B05D 7/14* (2013.01); *C09K 13/08* (2013.01); *C23C 8/04* (2013.01); *C23C 8/26* (2013.01)

(58) Field of Classification Search
None
See application file for complete search history.

(56) References Cited

U.S. PATENT DOCUMENTS

| | | | | |
|---|---|---|---|---|
| 4,746,376 A | * | 5/1988 | Bessey | ............ C23C 8/04 148/214 |
| 4,790,888 A | * | 12/1988 | Bessey | ............ C21D 1/72 148/23 |
| 5,547,770 A | * | 8/1996 | Meelu | ............ B32B 15/01 427/252 |

(Continued)

FOREIGN PATENT DOCUMENTS

| | | |
|---|---|---|
| CN | 106346146 B | 1/2018 |
| EP | 1431421 A1 | 6/2004 |
| WO | WO03075324 A1 | 9/2003 |

OTHER PUBLICATIONS

Conner et al., "Coating Rejuvenation: New Repair Technology for High Pressure Turbine Blades", ASME Turbo Expo 2000: Power for Land, Sea, and Air, vol. 4, pp. 7, Munich, Germany, May 8-11, 2000, 7 Pages.

(Continued)

*Primary Examiner* — Allan W. Olsen
(74) *Attorney, Agent, or Firm* — Dority & Manning, P.A.

(57) ABSTRACT

A method for removing a ceramic coating from a substrate is presented. The method includes contacting the ceramic coating with a composition including a fluoride source and nitric acid. A method of forming a component having a variation in saturation magnetization is presented. The method includes masking selected portions of a surface of a metallic component using a ceramic coating to form a masked metallic component; selectively diffusing nitrogen into the metallic component by exposing the masked metallic component to a nitrogen-rich atmosphere; and removing the ceramic coating from the surface of the metallic component by contacting the ceramic coating with a composition including the fluoride source and nitric acid.

15 Claims, 2 Drawing Sheets

(56) References Cited

U.S. PATENT DOCUMENTS

| | | | |
|---|---|---|---|
| 5,580,800 A * | 12/1996 | Zhang | H01L 21/02071 |
| | | | 148/DIG. 51 |
| 6,354,310 B1 | 3/2002 | Farr et al. | |
| 6,758,914 B2 | 7/2004 | Kool et al. | |
| 6,916,429 B2 | 7/2005 | Kool et al. | |
| 7,279,116 B2 | 10/2007 | Sax | |
| 7,709,057 B2 | 5/2010 | Fusaro et al. | |
| 9,212,555 B2 * | 12/2015 | Manier | C23F 1/44 |
| 9,803,139 B1 | 10/2017 | Bonitatibus, Jr. et al. | |
| 9,879,356 B2 | 1/2018 | Wittel et al. | |
| 10,276,667 B1 * | 4/2019 | Atanackovic | H01L 29/1608 |
| 2002/0100493 A1 * | 8/2002 | Kool | C23C 4/02 |
| | | | 134/3 |
| 2004/0074873 A1 * | 4/2004 | Kool | C23G 1/02 |
| | | | 216/109 |
| 2005/0161438 A1 | 7/2005 | Kool et al. | |
| 2007/0203041 A1 * | 8/2007 | Lee | C11D 3/3947 |
| | | | 510/175 |
| 2009/0302004 A1 | 12/2009 | Manier et al. | |
| 2010/0120230 A1 * | 5/2010 | Grivna | H01L 21/78 |
| | | | 438/464 |
| 2010/0126878 A1 | 5/2010 | Marjanovic et al. | |
| 2011/0088720 A1 | 4/2011 | Varanasi et al. | |
| 2011/0175225 A1 * | 7/2011 | Seddon | H01L 21/76898 |
| | | | 257/750 |
| 2012/0129049 A1 * | 5/2012 | Rayner | C22C 21/02 |
| | | | 429/220 |
| 2015/0115749 A1 * | 4/2015 | Dial | H01F 1/147 |
| | | | 310/46 |
| 2016/0203898 A1 * | 7/2016 | Johnson | H01F 7/021 |
| | | | 335/302 |
| 2016/0203899 A1 * | 7/2016 | Zou | H01F 7/021 |
| | | | 335/302 |
| 2016/0359100 A1 * | 12/2016 | Bhushan | H01L 43/02 |
| 2018/0183279 A1 * | 6/2018 | Kool | B32B 15/01 |

OTHER PUBLICATIONS

Yadav et al., "Slurry erosive wear study of d-gun sprayed coatings on SAE 431", 2013 International Conference on Control, Computing, Communication and Materials (ICCCCM), Allahabad, 2013, 5 Pages "For Long-Term Oxidation Protection for Metals", ZYP Coatings, Sealmet Flyer, retrieved from https://www.zypcoatings.com/wp-content/uploads/Sealmet-zyp01.pdf on Apr. 10, 2018, 1 Page.

Partial European Search Report Corresponding to Application No. 119166413.5 dated Sep. 26, 2019.

* cited by examiner

METHODS OF REMOVING A CERAMIC COATING FROM A SUBSTRATE

STATEMENT REGARDING FEDERALLY SPONSORED RESEARCH & DEVELOPMENT

This invention was made with Government support under contract number DE-EE0007755, awarded by the United States Department of Energy. The Government has certain rights in the invention.

BACKGROUND

Embodiments of the disclosure generally relate to methods of removing a ceramic coating from a substrate. More particularly, embodiments of the disclosure relate to methods of removing a ceramic coating used as a mask for selective nitrogenation of a metallic component.

A number of advanced ceramic coating systems are often applied to one or more surfaces of metallic components. The ceramic coatings are often used to protect the surface or substrate, e.g., by providing electrical or thermal insulation, or by providing wear resistance, corrosion resistance, or oxidation resistance. A wide variety of specialty materials are available for these uses. In some instances, the various ceramic coatings mentioned above may be used for purposes other than surface protection. For example, they may be used as gas-barrier coatings; or for masking sections of a substrate while other processing steps are carried out on the substrate.

Many of these ceramic coating materials are designed to be permanently deposited on the substrate, and not to be removed during the life of the component on which these coatings are deposited. However, some of the performance coatings described above may be useful for applications in which the coatings need to be removed at some point. One example relates to various ceramic coatings used as masking materials, e.g., during selective nitrogenation of metallic components to vary the magnetic properties.

However, conventional materials and processes for removing various ceramic coatings from substrates may exhibit drawbacks. Some of the coating removal methods are unable to remove most of the coating material from the surface. Other coating removal methods may be somewhat effective in removing the coating material, but damage or otherwise modify the underlying substrate, e.g., damage the underlying metallic substrate used during nitrogenation. Thus, there is a need for improved methods of removing ceramic coatings from a substrate.

BRIEF DESCRIPTION

In one aspect of the disclosure, a method for removing a ceramic coating from a substrate is presented. The ceramic coating includes aluminum silicide, sodium aluminum silicate, potassium aluminum silicate, sodium potassium aluminum silicate, or combinations thereof. The method includes contacting the ceramic coating with a composition including a fluoride source and nitric acid.

In another aspect of the disclosure, a method of forming a component having a variation in saturation magnetization is presented. The method includes masking selected portions of a surface of a metallic component using a ceramic coating to form a masked metallic component; selectively diffusing nitrogen into the metallic component by exposing the masked metallic component to a nitrogen-rich atmosphere; and removing the ceramic coating from the surface of the metallic component by contacting the ceramic coating with a composition including a fluoride source and nitric acid.

DRAWINGS

These and other features, aspects, and advantages of the present disclosure will become better understood when the following detailed description is read with reference to the accompanying drawings, wherein.

DETAILED DESCRIPTION

Figure 1:
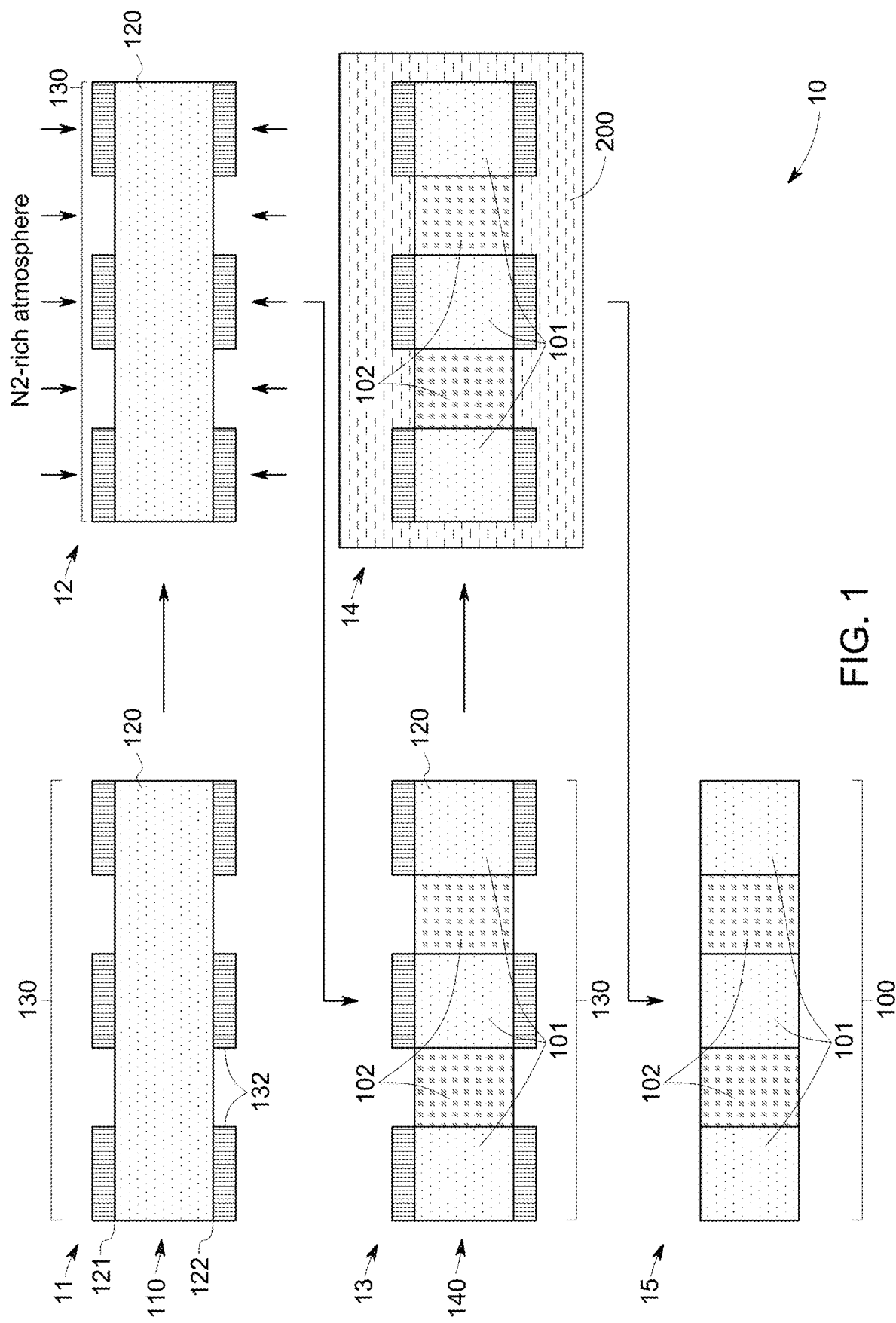
FIG. 1 illustrates side elevation views of a component having a variation in saturation magnetization being formed, via a sequence of steps, in accordance with some embodiments of the disclosure.

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

As used herein, the term "disposed on" refers to layers or coatings disposed directly in contact with each other or indirectly by having intervening layers there between, unless otherwise specifically indicated. The term "depositing on" refers to a method of laying down material in contact with an underlying or adjacent surface in a continuous or discontinuous manner. The term "adjacent" as used herein means that the two materials or coatings are disposed contiguously and are in direct contact with each other.

A method for removing a ceramic coating from a substrate is presented. The method includes contacting the ceramic coating with a composition including a fluoride source and nitric acid.

The substrate on which the ceramic coating is disposed may be formed from a variety of materials, non-limiting examples of which include metallic materials. The term metallic material as used herein includes elemental metal, metal alloy, or a combination thereof. Non-limiting examples of suitable metallic materials include iron, cobalt, nickel, aluminum, chromium, titanium, and copper, as well as mixtures or alloys which include any of the foregoing (e.g., stainless steel). In certain embodiments, the substrate includes a metal alloy, for example, an iron-based alloy. Moreover, in some embodiments, the substrate may be formed from a nonmetallic material like a polymer or a ceramic, that includes at least one metallic surface on which the ceramic coating is disposed.

A variety of ceramic coatings can be deposited on one or more surfaces of the substrate, depending on the end-use requirement, as described earlier. As used herein, the term "ceramic coating" refers to a coating including one or more ceramic materials, for example, an oxide, a nitride, or a carbide. In certain embodiments, the ceramic coating includes one or more oxides. The ceramic coating may further include one or more additional constituents that may be present in the coating as a glass phase. In some embodiments, the ceramic coating may include a plurality of ceramic particles dispersed in a glass phase. The composition of the glass phase may be the same or different from that of the ceramic material, e.g., ceramic particles.

In some embodiments, the ceramic coating includes aluminum silicide, an aluminum silicate or a combination thereof. Non-limiting example of a suitable aluminide-silicide ceramic coating material is SermaLoy™ J, commercially available from Sermatech International, Inc. of Pottstown, Pa. The term "aluminum silicate" as used herein includes aluminum silicate coating compositions that may include one or more additional metals or metalloids. In some embodiments, the aluminum silicate ceramic coating compositions include at least one alkali metal, such as, sodium or potassium. In some embodiments, the ceramic coating includes sodium aluminum silicate, potassium aluminum silicate, sodium potassium aluminum silicate, or combinations thereof. One non-limiting example of an aluminum silicate ceramic coating material is Sealmet™ (sodium-potassium-aluminum-silicate), commercially available from ZYP Coatings, Inc., Oak Ridge, Tenn.

In some embodiments, the ceramic coating material, e.g., the aluminum silicide and/or the aluminum silicate may be exposed to substantially high temperatures, during the deposition of the ceramic coating and/or the end-use application, such that these materials are at least partially modified (e.g., reduced or oxidized). In some such instances, the ceramic coating that needs to be removed from the substrate may include one or more additional components besides the aluminum silicide and/or the aluminum silicate. For example, in some embodiments, the ceramic coating may further include mixed ceramic oxides in addition to the aluminum silicate. In certain embodiments, the ceramic coating includes aluminum silicate (e.g., present as a plurality of aluminum silicate particles) dispersed in a silicate-glass matrix.

The ceramic coating composition before being deposited on one or more surfaces of the substrate may include one or more additional constituents. For example, aluminum silicate ceramic coatings compositions are often available in the form of a liquid dispersion, such as, an aqueous dispersion. The dispersion may also include various organic constituents, e.g., binders, dispersants, defoamers, and the like. The ceramic coating that needs to be removed may therefore include some of these additional constituents as mentioned above, in accordance with some embodiments of the disclosure. The ceramic coating may have a thickness in a range from about 25 microns to about 250 microns, and in certain embodiments from about 75 microns to about 125 microns.

As noted previously, the ceramic coating is contacted with a composition including a fluoride source and nitric acid. The term "fluoride source" as used herein refers to a source of a fluoride ion in the composition. Non-limiting examples of a suitable fluoride source include ammonium fluoride, ammonium bifluoride, sodium fluoride, potassium fluoride, lithium fluoride, or combinations thereof. In certain embodiments, the fluoride source includes hydrofluoric acid. In certain embodiments, the nitric acid is present in the composition in the form of concentrated nitric acid (e.g., 70% concentrated nitric acid).

The composition for treating the ceramic coating may be further characterized by the amount of fluoride source and nitric acid present in the composition. In some embodiments, an amount of the fluoride source in the composition is in a range from about 5 weight % to about 30 weight % of the composition. In some embodiments, an amount of the nitric acid in the composition is in a range from about 50 weight % to about 95 weight %. As noted earlier, in some such instances, the nitric acid is 70% by weight concentrated nitric acid. In certain embodiments, the composition for treating the ceramic coating includes 5 weight % of hydrofluoric acid, 35 weight % of concentrated nitric acid (70 wt %), and balance water.

Various techniques can be used to contact the ceramic coating with the composition including the fluoride source and nitric acid. For example, the ceramic coating can be continuously sprayed with the composition, using various types of spray guns. Alternatively, the coating could be brushed onto the substrate, or poured over the coating (and continuously recirculated). In certain embodiments, the substrate with the ceramic coating disposed thereon is immersed in a bath of the composition using any suitable vessel. Immersion in this manner may allow the greatest degree of contact between the composition and the ceramic coating which is being removed. During the immersion, the bath may be stirred or otherwise agitated by conventional techniques. In some instances, the substrate may be rotated or spun within the bath, to ensure maximum exposure of the surfaces of the substrate to the composition.

Immersion time and bath temperature may depend on a number of factors, such as the size of the coated substrate; the composition of the ceramic coating being removed; the coating thickness; or the manner in which the coating has been deposited on the surface of the substrate. In some embodiments, the ceramic coating is contacted with the composition at a temperature in a range from about 25° C. to about 60° C. In certain embodiments, the ceramic coating is contacted with the composition at room temperature, that is, about 25° C. Further, the ceramic coating is contacted with the composition for a time duration in a range from about 10 min to about 60 min. After immersion for the required amount of time and removal from the bath, the substrate may be rinsed in water (often until the pH of the water is neutral), for further use or processing Contact with the treatment composition, as described herein, may remove substantially all of the ceramic coating, in some embodiments. As used in this context, removal of "substantially all of the ceramic coating" means removing at least 90% of the ceramic coating on all surfaces of the substrate. In certain embodiments removal of "substantially all of the ceramic coating" means removing at least 99% of the ceramic coating on all surfaces of the substrate. Further, treatment with the composition may remove the ceramic coating without substantially affecting the underlying substrate surface, e.g., without pitting the surface or damaging it via intergranular boundary attack, in a way that would detract from its end use.

In some embodiments, the substrate is a metallic magnetic component. The term "magnetic component", as used herein, refers to any component that reacts with a magnetic field to produce a functional response. These responses include, but are not limited to, a mechanical torque, an electrical potential, and/or a change in temperature. In some embodiments, the magnetic component may be a magnetic component of an electrical machine. Non-limiting examples of a magnetic component include magnetic components (such as, laminates) used in a stator or rotor of an electrical machine.

In certain embodiments, the magnetic component is characterized by a variation in saturation magnetization. The term "variation in saturation magnetization" as used herein means that the saturation magnetization is different in different portions of the component. For certain metal alloys forming the magnetic component, the nitrogen content in a region is associated with a magnetism of that particular region. Thus, in accordance with embodiments of the disclosure, a variation in saturation magnetization in a magnetic component is achieved by selectively varying the nitrogen content in the component.

Typically, the nitrogen content in a metallic component is varied by employing ceramic coatings disposed as patterned masks on the component. The ceramic coatings function as a "nitrogen barrier" material, that is, the ceramic coating selectively inhibits or reduces the amount of nitrogen that diffuses into certain portions of the metallic component, thereby, varying the nitrogen content and the saturation magnetization across the metallic component. The ceramic coatings may however pose several technical and process challenges, for example, the coatings may tenaciously adhere to the underlying substrate, which is desirable during the nitrogenation step. These ceramic coatings, however, may not be easily removed after the nitrogenation step, without affecting the underlying metallic component. Some of the embodiments described herein address the noted shortcomings in conventional methods for stripping the ceramic coating used as masks during the nitrogenation methods by contacting the ceramic coating with a composition including a fluoride source and nitric acid.

In some embodiments, a method of forming a component having a variation in saturation magnetization is presented. The method includes masking selected portions of a surface of a metallic component using a ceramic coating to form a masked metallic component. The method further includes selectively diffusing nitrogen into the metallic component by exposing the masked metallic component to a nitrogen-rich atmosphere; and removing the ceramic coating from the surface of the metallic component by contacting the ceramic coating with a composition including a fluoride source and nitric acid.

Figure 2:
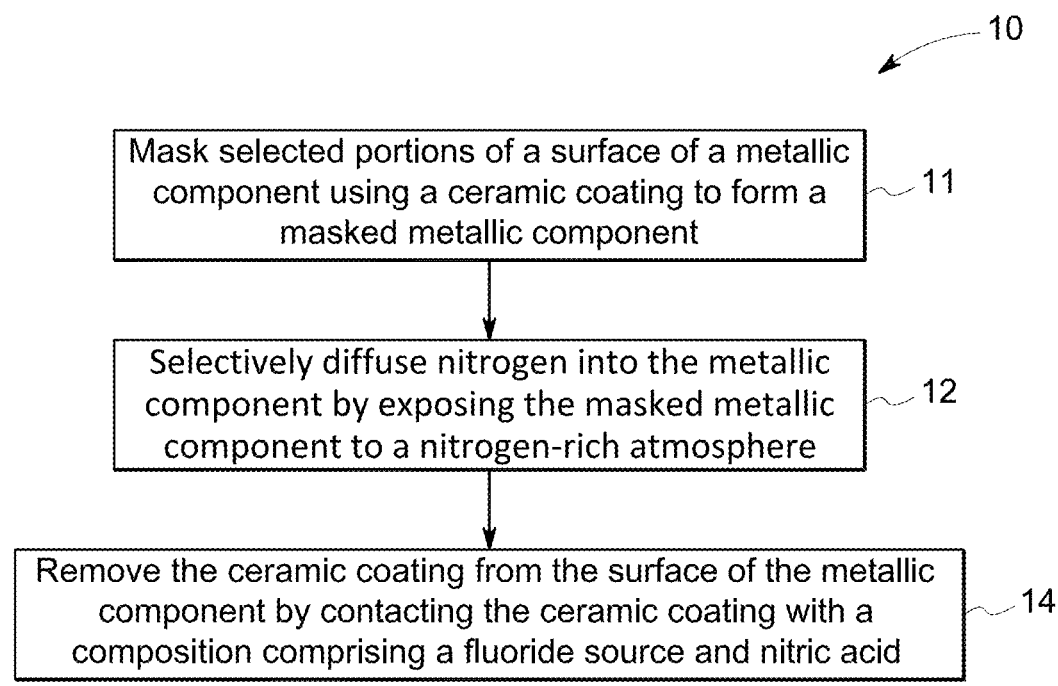
FIG. 2 is a flow chart of a sequence of steps performed during a method for forming a component having a variation in saturation magnetization, in accordance with some embodiments of the disclosure.

Referring now to FIG. 1, side elevation views of a component 100 having a variation in saturation magnetization being formed, via a sequence of steps, in accordance with some embodiments of a method 10 of the disclosure, are illustrated. FIG. 2 is a flow chart of a sequence of steps performed during a method 10 for forming a component 100 having a variation in saturation magnetization, in accordance with some embodiments of the disclosure;

As shown in FIGS. 1 and 2, the method 10 includes, at step 11, masking selected portions of a surface 121, 122 of a metallic component 120 using a ceramic coating 130 to form a masked metallic component 110. The step 11 of method 10 may include procuring a pre-fabricated masked metallic component 110 or fabricating the masked metallic component 110 by disposing the ceramic coating 130 on the metallic component 120 to form a mask. The mask may be formed by either disposing a uniform ceramic coating on the metallic component 120 followed by selective patterning of the ceramic coating to form patterned regions 132, or, by masking selected portions of the metallic component 120, followed by selectively disposing the ceramic coating on the surfaces of the unmasked portions of the metallic component 120.

It should be noted that FIG. 1 is for illustration purposes only, and the masked metallic component 110 is illustrated as having a rectangular shape only for ease of illustration. Metallic components and corresponding masked metallic components having any suitable geometry and shape are envisaged within the scope of the disclosure. Further, although the size and shape of the patterned regions 132 of the ceramic coating 130 are illustrated to be substantially similar, the shape and size of the patterned regions 132 may vary. Further, the different patterned regions 132 may have the same or different length, width, and thickness values, depending on the shape of the metallic component 120 and the end use requirements.

The metallic component 120 may include a single elemental metal, a metal alloy, or a combination thereof. In some embodiments, the metallic component 120 includes a metal alloy. In certain embodiments, the metallic component 120 includes an iron-based metal alloy. In some embodiments, the iron-based alloy may further include chromium, manganese, or a combination thereof. In some embodiments, the iron-based alloy may have a ferrite or martensitic structure. In some embodiments, the iron-based alloy includes about 20 weight % chromium and about 5 weight % manganese with the balance being substantially iron. In some embodiments, the chromium and manganese concentrations may be between 14 and 20 weight % and between 2 and 5 weight %, respectively, with the balance being iron. In some embodiments, part of the iron may be substituted with up to 35 weight % cobalt. In some embodiments, part of chromium may be substituted with up to 8 weight % aluminum. In some embodiments, part of the iron may be substituted with up to 35 weight % cobalt and part of chromium may be substituted with up to 8 weight % aluminum.

Further, the ceramic coating 130 may include any suitable ceramic material, as described, hereinabove. In some embodiments, the ceramic coating 130 includes aluminum silicide, an aluminum silicate or a combination thereof. Non-limiting example of a suitable aluminide-silicide ceramic coating material is SermaLoy™ J, commercially available from Sermatech International, Inc. of Pottstown, Pa. In certain embodiments, the ceramic coating 130 includes sodium aluminum silicate, potassium aluminum silicate, sodium potassium aluminum silicate, or combinations thereof. One non-limiting example of an aluminum silicate ceramic coating material is Sealmet™ (sodium-potassium-aluminum-silicate), commercially available from ZYP Coatings, Inc., Oak Ridge, Tenn. Further, as noted above, in some embodiments, the ceramic coating 130 may further include mixed ceramic oxides in addition to the aluminum silicate. In certain embodiments, the ceramic coating includes a plurality of aluminum silicate particles dispersed in a silicate-glass matrix.

As noted previously, diffusion of nitrogen into the metallic component 120 may result in formation of partially-magnetic and/or non-magnetic regions in the metallic component 120. Therefore, at step 11, the surfaces of the metallic component 120 may be masked with the ceramic coating 130 such that regions of the metallic component 120 that are designed to remain magnetic are masked by the regions 132 of the ceramic coating, such that nitrogen diffusion into these regions is avoided. Further, at step 11, the surfaces of the metallic component 120 may be masked such that the regions of the metallic component 120 that are designed to be partially-magnetic or non-magnetic are unmasked during the subsequent nitrogenation step, such that at least some nitrogen diffuses into the metallic component 120 in these regions.

With continued reference to FIGS. 1 and 2, the method 10 further includes, at step 12, exposing the masked metallic component 110 to a nitrogen-rich atmosphere. Exposing the masked metallic component 110 to a nitrogen-rich atmosphere such that the nitrogen selectively diffuses into the metallic component 120 is referred to herein as "selective nitrogenation". As noted earlier, the masked metallic component 110 may be subjected to selective nitrogenation by employing the ceramic coating 130 as a nitrogen barrier layer. As used herein, the term "selective nitrogenation" refers to the controlled nitrogenation of desired regions of the component, without substantially altering the ferromagnetic nature of the nearby regions. The ferromagnetic nature of a nearby region may be considered to be "substantially altered", if the average saturation magnetization of that region is reduced by more than about 5 volume % of that region.

The selective nitrogenation of the metallic component 120 may be carried out through a solid, liquid, gaseous, or plasma route. In some embodiments, elevated temperature gas nitrogenation is used to introduce nitrogen to the metallic component 120. In certain embodiments, the elevated temperature gas nitrogenation includes heat-treating the masked metallic component 110 in a nitrogen atmosphere at an elevated temperature. Alternately, heat treatment in a mixture of ammonia and hydrogen may be used for nitrogen diffusion. The elevated temperatures in this technique allow for fast diffusion of nitrogen, providing a quicker processing route. In some embodiments, heat treatment in a molten salt bath containing cyanides, cyanates, or a combination thereof may be used for nitrogen diffusion. Therefore, the term "nitrogen-rich atmosphere" as used herein refers to an atmosphere including nitrogen, ammonia, a mixture of ammonia and hydrogen, cyanide, cyanate, or combinations thereof.

In some embodiments, the nitrogen-rich atmosphere includes greater than 90% of nitrogen. In certain embodiments, nitrogenation is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing.

In some embodiments, selective nitrogenation includes heat-treating the masked metallic component 110 in a nitrogen atmosphere at a temperature greater than 700° C. In certain embodiments, selective nitrogenation includes gas nitrogenation of the masked metallic component 110 in a nitrogen atmosphere at a temperature greater than 800° C. In some embodiments, the pressure used for gas nitrogenation is greater than 0.5 atmospheres (atm.). In some embodiments, an ambient pressure of greater than 1 atm. and a temperature greater than 900° C. is used for nitrogenation.

When the masked metallic component 110 is exposed to a nitrogen-rich atmosphere, the nitrogen diffuses into the metallic component 120, through the exposed surfaces the metallic component 120, including the top surface 121 and the bottom surface 122, as shown in FIG. 1. In the embodiment illustrated in FIG. 1, although, the nitrogen diffuses through the top surface 121 and the bottom surface 122, appropriate control of the nitrogenation parameters may allow the nitrogen to diffuse further into the length, width, and thickness of the metallic component 120, through the exposed surfaces of the metallic component 120, while the regions 132 of the ceramic coating 130 prevent substantial nitrogen diffusion through those regions.

As mentioned previously, the diffused nitrogen, in conjunction with the composition of the component, may change the local phase stability in the nitrogen-diffused regions, and converts these regions into at least partially austenite phase. As the method includes selective introduction of nitrogen to different regions of the metallic component 120, these regions are characterized by a nitrogen content and saturation magnetization that is different from each other.

With continued reference to FIG. 1, the method 10 further includes, at step 13, forming a first region 101 and a second region 102 in the metallic component 120 to form the component 100. The first region 101 and the second region 102 are characterized by a nitrogen content that is different from each other and a saturation magnetization value that is different from each other. As noted earlier, nitrogen content in a region is associated with a magnetism of that particular region. In some embodiments, the magnetism of a region increases with decreasing nitrogen content in that region. Thus, in some embodiments, a region is magnetic if a nitrogen content of that region is less than 0.1 weight % of that region, and a region is non-magnetic if a nitrogen content of that region is greater than 0.4 weight % of that region. Further, a region is partially-magnetic if a nitrogen content is in a range from about 0.1 weight % to about 0.4 weight % of that region.

Thus, in some embodiments, the method 10, includes, at step 13, forming a component 140 including a metallic component 120 having a variation in saturation magnetization, and a ceramic coating 130 disposed thereon. As noted previously, prior to using the component 140, e.g., by incorporating it into an electrical machine, the ceramic coating 130 may need to be removed. In certain embodiments, it may be desirable that the ceramic coating 130 is substantially removed without substantially affecting the underlying surface of the metallic component 120.

With continued reference to FIGS. 1 and 2, the method 10 further includes, at step 14, removing the ceramic coating 130 from the surface 121, 122 of the metallic component 120 by contacting the ceramic coating 130 with a composition 200 including a fluoride source and nitric acid. The compositional characteristics of the treatment composition 200 as well as the treatment conditions are described hereinabove in detail. Further, although FIG. 1 illustrates immersion of the metallic component 120 in the treatment composition as one suitable technique for contacting the treatment composition 200 with the ceramic coating, any other suitable technique may also be employed.

Contact with the treatment composition 200, as described herein, removes substantially all of the ceramic coating 130, in some embodiments, as shown in step 15 of FIG. 1. As used in this context, removal of "substantially all of the ceramic coating" means removing at least 90% of the ceramic coating 130 on all surfaces of the metallic component 120. In certain embodiments, removal of "substantially all of the ceramic coating" means removing at least 99% of the ceramic coating 130 on all surfaces of the metallic component 120. Further, treatment with the composition 200 may remove the ceramic coating 130 without substantially affecting the underlying metallic component surface 121, 122, e.g., without pitting the surface or damaging it via intergranular boundary attack, in a way that would detract from its end use.

The method 10 further includes, at step 15, forming a component 100. The component 100 may be then utilized in a suitable electrical machine, for example, a motor, a generator, a transformer, a toroid, an inductor, and combinations thereof. In some embodiments, the component 100 is a component of a motor or a generator, such as, for example, a rotor, a stator, or a combination thereof. In certain embodiments, the component 100 is a laminate or a portion of a laminate used in a stator or a rotor of motor.

EXAMPLES

The examples that follow are merely illustrative, and should not be construed to be any sort of limitation on the scope of the claimed invention. Unless specified otherwise, all ingredients are commercially available from common chemical suppliers.

Example 1

A ceramic coating formed of Sealmet™ material (sodium-potassium-aluminum-silicate), available from ZYP Coatings, Inc., Oak Ridge, Tenn., USA, was applied to a ferritic steel coupon. The coating was dried at a temperature of about 525° C., and then fired at a temperature of 1100-1200° C. The fully-baked coating had a thickness of about 3-5 mils (~75-125 microns).

Figure 3A:
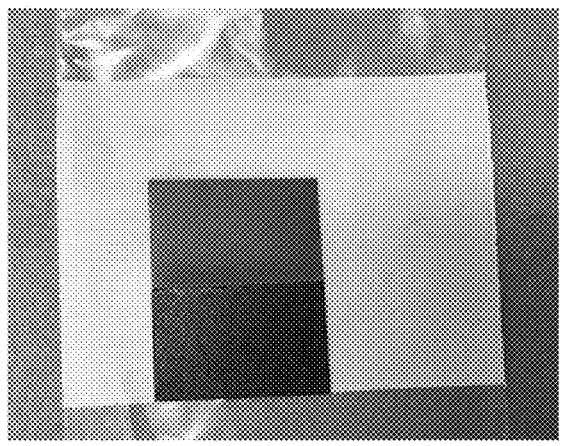
FIG. 3A shows a photograph of a coupon before the treatment with the hydrofluoric acid and nitric acid mixture.
Figure 3B:
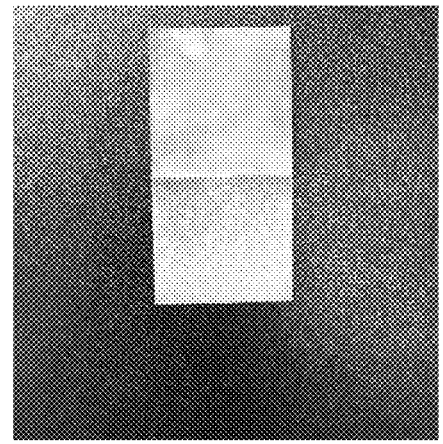
FIG. 3B shows a photograph of the coupon of FIG. 3A, after the treatment with the hydrofluoric acid and nitric acid mixture.

A composition for selectively removing the ceramic coating was prepared using 5% (by weight) hydrofluoric acid in 35% (by weight) concentrated nitric acid (70 wt %), and the balance being water. The ceramic coated coupon was fully immersed in a bath of this composition at room temperature (25° C.) for 9 minutes. After removal from the bath, the coupon was rinsed and examined. FIG. 3A show the photograph of the coupon before the treatment with the hydrofluoric acid and nitric acid mixture. FIG. 3B show the photograph of the coupon of FIG. 3A, after the treatment with the hydrofluoric acid and nitric acid mixture. As shown in FIG. 3B, the Sealmet™ coating was completely removed after treatment with the hydrofluoric acid and nitric acid mixture.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method for removing a ceramic coating from a substrate, comprising:
    applying the ceramic coating as a patterned mask over the substrate to define a masked portion and an unmasked portion thereon, wherein the ceramic coating comprises aluminum silicide, sodium aluminum silicate, potassium aluminum silicate, sodium potassium aluminum silicate, or combinations thereof, and wherein the substrate is a magnetic component; and
    contacting the ceramic coating with a composition comprising a fluoride source and nitric acid.

2. The method of claim 1, wherein the fluoride source comprises hydrofluoric acid.

3. The method of claim 1, wherein the fluoride source comprises ammonium fluoride, ammonium bifluoride, sodium fluoride, potassium fluoride, lithium fluoride, or combinations thereof.

4. The method of claim 1, wherein an amount of the fluoride source in the composition is in a range from about 5 weight % to about 30 weight %.

5. The method of claim 1, wherein an amount of the nitric acid in the composition is in a range from about 50 weight % to about 95 weight %.

6. The method of claim 1, wherein the ceramic coating is contacted with the composition at a temperature in a range from about 25° C. to about 60° C.

7. The method of claim 1, wherein the ceramic coating is contacted with the composition for a time duration in a range from about 10 min to about 60 min.

8. The method of claim 1, wherein the substrate comprises a metal alloy.

9. The method of claim 1, wherein the ceramic coating comprises the sodium-potassium-aluminum-silicate.

10. The method of claim 1, wherein the ceramic coating includes at least one alkali metal.

11. The method of claim 10, wherein the at least one alkali metal comprises sodium.

12. The method of claim 10, wherein the at least one alkali metal comprises potassium.

13. A method for removing a ceramic coating from a substrate, comprising:
    applying the ceramic coating as a patterned mask over the substrate to define a masked portion and an unmasked portion thereon, wherein the ceramic coating comprises aluminum silicide, sodium aluminum silicate, potassium aluminum silicate, sodium potassium aluminum silicate, or combinations thereof, and wherein the substrate comprises an iron-based alloy; and
    contacting the ceramic coating with a composition comprising a fluoride source and nitric acid.

14. The method of claim 13, wherein the iron-based alloy includes 14 weight % and 20 weight % chromium and between 2 weight % and 5 weight % of manganese with the balance being iron.

15. A method for removing a ceramic coating from a substrate, comprising:
- applying the ceramic coating as a patterned mask over the substrate to define a masked portion and an unmasked portion thereon, wherein the ceramic coating comprises aluminum silicide, sodium aluminum silicate, potassium aluminum silicate, sodium potassium aluminum silicate, or combinations thereof,
- exposing the substrate to a nitrogen-rich atmosphere such that nitrogen selectively diffuses into the unmasked portion; and
- thereafter, contacting the ceramic coating with a composition comprising a fluoride source and nitric acid.

* * * * *